US010447628B2

(12) United States Patent
Dettinger et al.

(10) Patent No.: US 10,447,628 B2
(45) Date of Patent: Oct. 15, 2019

(54) CONTROLLING ELECTRONIC MESSAGING COMMUNICATION SESSIONS BASED ON DOCUMENT CONTAINERS

(71) Applicant: International Business Machines Corporation, Armonk, NY (US)

(72) Inventors: Richard D. Dettinger, Rochester, MN (US); Brian E. Olson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 185 days.

(21) Appl. No.: 15/401,597

(22) Filed: Jan. 9, 2017

(65) Prior Publication Data

US 2018/0198741 A1    Jul. 12, 2018

(51) Int. Cl.
*H04L 12/58* (2006.01)
*G06F 16/93* (2019.01)

(52) U.S. Cl.
CPC .............. *H04L 51/08* (2013.01); *G06F 16/93* (2019.01); *H04L 51/04* (2013.01)

(58) Field of Classification Search
CPC ..................... G06F 17/30011; H04L 51/08
See application file for complete search history.

(56) References Cited

U.S. PATENT DOCUMENTS

| | | | | |
|---|---|---|---|---|
| 7,305,441 B2 * | 12/2007 | Mathewson, II | .... | G06Q 10/107 709/206 |
| 8,201,078 B2 | 6/2012 | Boyer et al. | | |
| 2009/0172118 A1 * | 7/2009 | Lee | ......... | H04L 51/14 709/206 |
| 2010/0146385 A1 | 6/2010 | Goulandris | | |
| 2013/0275849 A1 | 10/2013 | King et al. | | |
| 2014/0250152 A1 | 9/2014 | Kaneyasu | | |
| 2014/0298207 A1 * | 10/2014 | Ittah | ....... | G06Q 10/00 715/753 |
| 2015/0195234 A1 * | 7/2015 | Bell | ....... | H04L 51/12 709/206 |
| 2015/0286636 A1 | 10/2015 | Elkhou et al. | | |
| 2016/0127282 A1 | 5/2016 | Nezarati et al. | | |
| 2016/0308967 A1 * | 10/2016 | Zhang | .................. | G06Q 10/00 |

* cited by examiner

*Primary Examiner* — Arvin Eskandarnia
*Assistant Examiner* — Juan C Turriate Gastulo
(74) *Attorney, Agent, or Firm* — Ryan Lewis; Edell, Shapiro & Finnan, LLC

(57) ABSTRACT

At least one electronic document is requested from one or more participants of the electronic messaging session in accordance with a series of rules that is associated with actions for the messaging session. In response to receiving the requested at least one electronic document into the electronic messaging session, actions associated with the series of rules for the electronic messaging session are performed.

18 Claims, 6 Drawing Sheets

CONTROLLING ELECTRONIC MESSAGING COMMUNICATION SESSIONS BASED ON DOCUMENT CONTAINERS

BACKGROUND

1. Technical Field

Present invention embodiments relate to electronic communications, and more specifically, to messaging systems that utilize document containers.

2. Discussion of the Related Art

Instant messaging, text messaging, and other instant collaboration software (ICS) solutions are used by hundreds of millions of consumers and are among the most important features of software today. Further, there is a growing demand for ICS in non-traditional domains (e.g., document processing, software development, healthcare coordination, customer relationship management (CRM) solutions, etc.). In particular, over the years, ICS has been extended to support document sharing. However, these services are limited and merely allow a user to pull a file into a chat communication and send the document to another user.

SUMMARY

According to one embodiment of the present invention, a method of conducting an electronic messaging session includes requesting at least one electronic document from one or more participants of the electronic messaging session in accordance with a series of rules. The series of rules is associated with actions for the messaging session. In response to receiving the requested electronic document(s) into the electronic messaging session, the associated actions of the series of rules for the electronic messaging session are performed.

BRIEF DESCRIPTION OF THE DRAWINGS

Generally, like reference numerals in the various figures are utilized to designate like components.

DETAILED DESCRIPTION

Present invention embodiments control an electronic messaging communication session (e.g., an instant messaging session, etc.) based on document containers. An electronic document is requested from one or more participants of the electronic messaging session in accordance with a series of rules. The rules may stipulate, for example, that a participant is not permitted to transmit an electronic message in the electronic messaging communication session until the requested electronic document has been submitted. In response to receiving the requested electronic document, actions corresponding to the rules are performed (e.g., the participant is permitted to transmit electronic messages in the electronic messaging communication session after submitting the electronic document).

Figure 1:
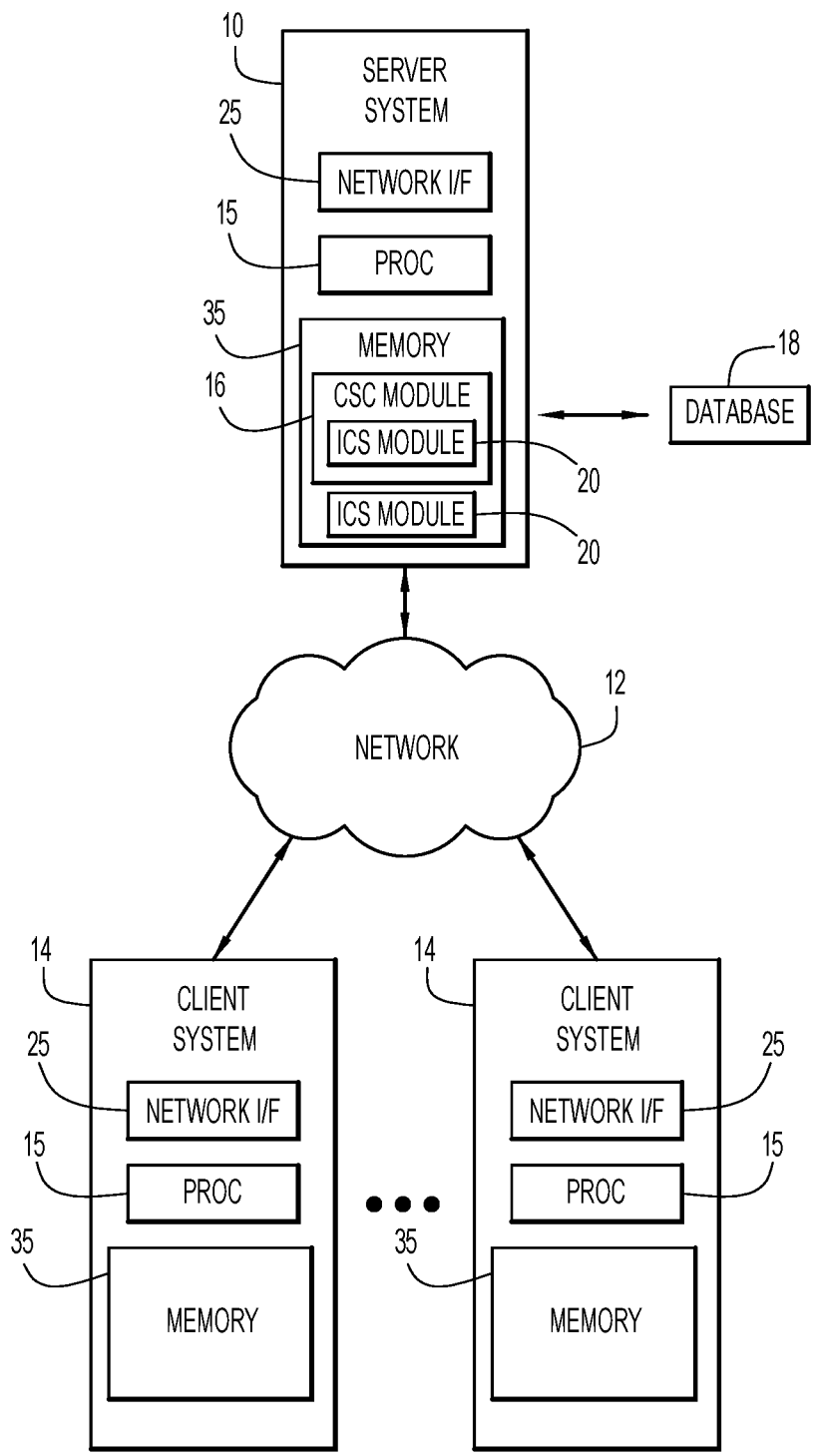
FIG. 1 is a diagrammatic illustration of an example environment for an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Client systems 14 enable users to collaborate over an electronic communication session (e.g., ICS, email, video chat, etc.) via server systems 10. The server system includes a communication session configuration module 16 to conduct communication sessions. The communication session configuration module 16 may include, or interact with, ICS modules 20 to conduct the communication sessions as described below. A database system 18 may store various information for the communication (e.g., the documents). The database system may be implemented by any conventional or other database or storage unit, may be local to or remote from server systems 10 and client systems 14, and may communicate via any appropriate communication medium (e.g., local area network (LAN), wide area network (WAN), Internet, hardwire, wireless link, Intranet, etc.). The client systems may present a graphical user (e.g., GUI, etc.) or other interface (e.g., command line prompts, menu screens, etc.) to enable users to participate in a communication session and submit desired documents.

Server systems 10 and client systems 14 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, communication session configuration module 16, browser/interface software, etc.).

Communication session configuration module 16 may include one or more modules or units to perform the various functions of present invention embodiments described below. The various modules may be implemented by any combination of any quantity of software and/or hardware modules or units, and may reside within memory 35 of the server for execution by processor 15.

Figure 2:
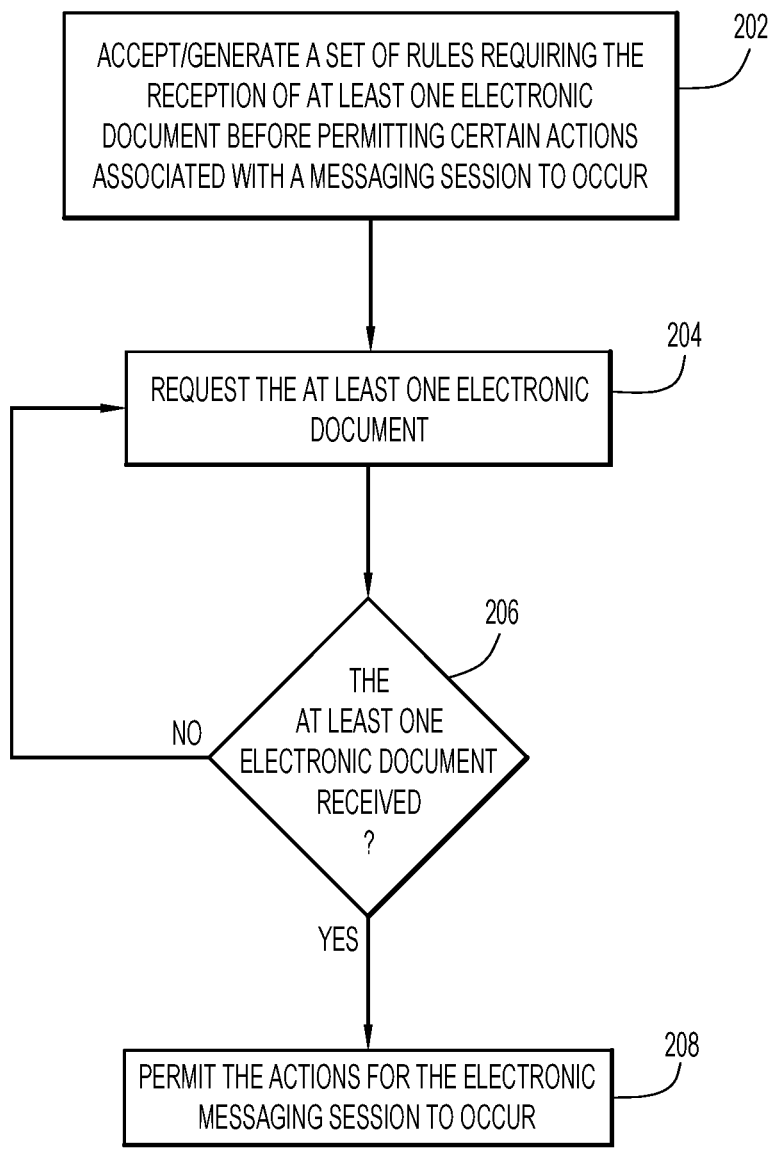
FIG. 2 is a flowchart illustrating an example manner of enabling an electronic communication session in accordance with an embodiment of the present invention.

An example manner of enabling an electronic communication session (e.g., via communication session configuration module 16) is illustrated by the flowchart of FIG. 2. Specifically, a set of rules for a communication session is accepted/generated (e.g., the rules may be set by an administrator, automatically configured, etc.) at block 202.

The rules may require the reception of at least one electronic document before permitting certain actions associated with the communication or session to occur. For example, the rules may require each participant to submit (e.g., upload/transfer/modify) a respective document (e.g., a non-disclosure agreement) before permitting communication via the communication session. In another example, the rules may require any participant to submit a particular document (e.g., a proof of medical insurance form) before certain types of documents (e.g., medical documents) may be submitted. In yet another example, the rules may require that a specific participant submit one or more particular documents (e.g., an end user license agreement and a privacy statement) before that participant can submit certain types of documents (e.g., medical documents). In yet a further example, the rules may require that a document regarding an anticipated topic of the electronic communication session (e.g., a patient medical record) be submitted before the communication is enabled in order to facilitate the electronic communication session.

Thus, the rules may include a variety of requirements with respect to the reception of one or more documents (e.g., requiring one or more particular documents by any participant, requiring reception of one or more documents by one or more specific participants, etc.). Further, the rules may control whether certain features (e.g., electronic communication via the electronic communication session, ability to submit certain documents, etc.) are enabled/disabled.

At block 204, a request is made for the at least one electronic document based on the set of rules for the communication session. The request may be made to one or more participants of the electronic communication session. The communication session configuration module 16 determines, at block 206, whether the at least one requested electronic document was received.

If the at least one electronic document was not received (e.g., if a participant has not submitted the at least one document to the communication session configuration module 16), the communication session configuration module 16 continues to prevent certain actions associated with the communication session from occurring. In an embodiment, subsequent requests can be made to one or more participants until every requested document has been received. For example, subsequent requests can be periodic. Alternatively, the initial request may be constant (e.g., a notification requesting at least one electronic document that disappears after the at least one electronic document is received).

If the at least one electronic document was received, the communication session configuration module 16 permits the actions to occur at block 208. In an example, the system permits the actions to occur automatically after all requested electronic documents have been received.

The communication session configuration module 16 may be configured to receive the electronic documents via document containers that store one or more electronic documents. A document container may determine the authenticity of an electronic document by a variety of features (e.g., templates, pattern recognition, extensions, embedded codes, embedded tags, etc.). In addition or alternatively, an electronic document may be manually verified as authentic. A document container may be configured to recognize and/or accept only certain types of documents.

Figure 3A:
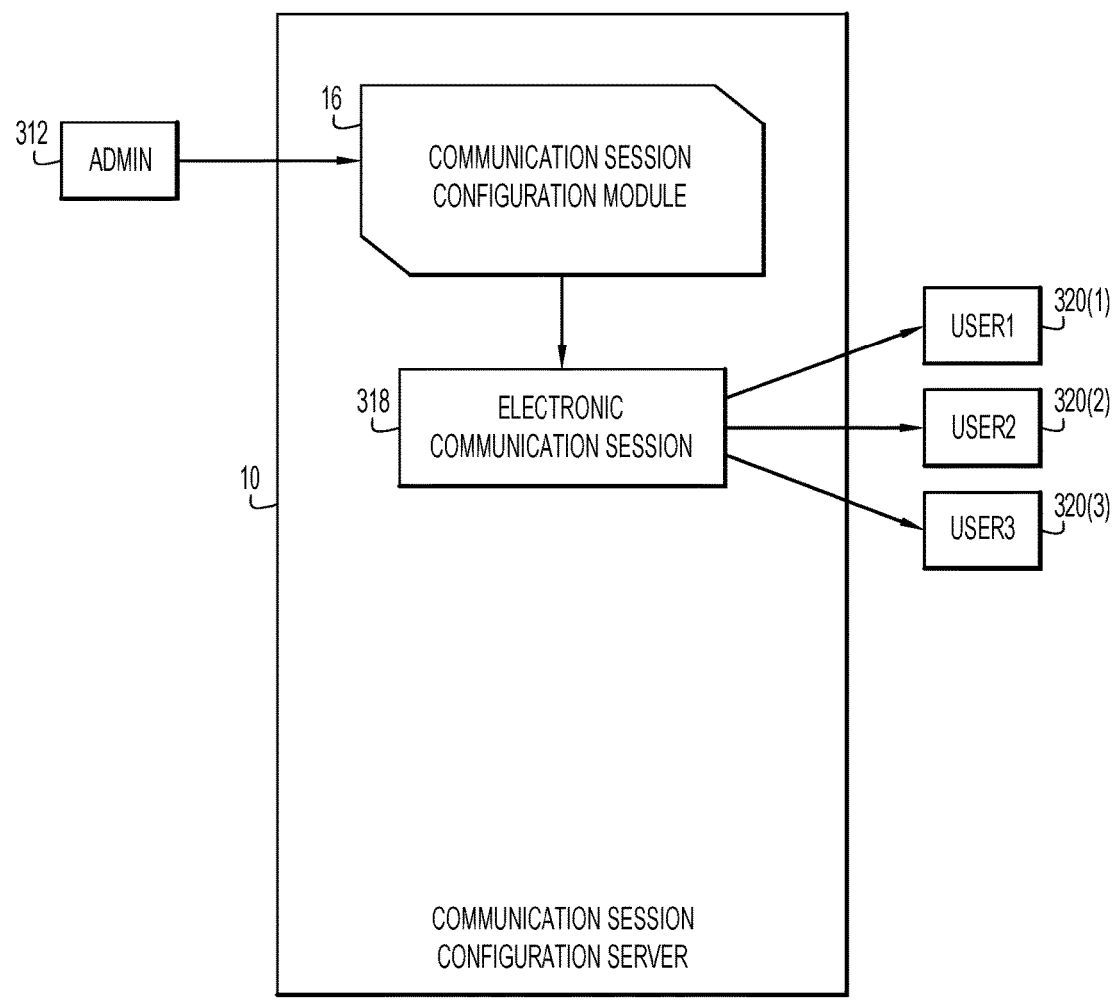
FIG. 3A is a diagrammatic illustration of an example communication session in accordance with an embodiment of the present invention.
Figure 3B:
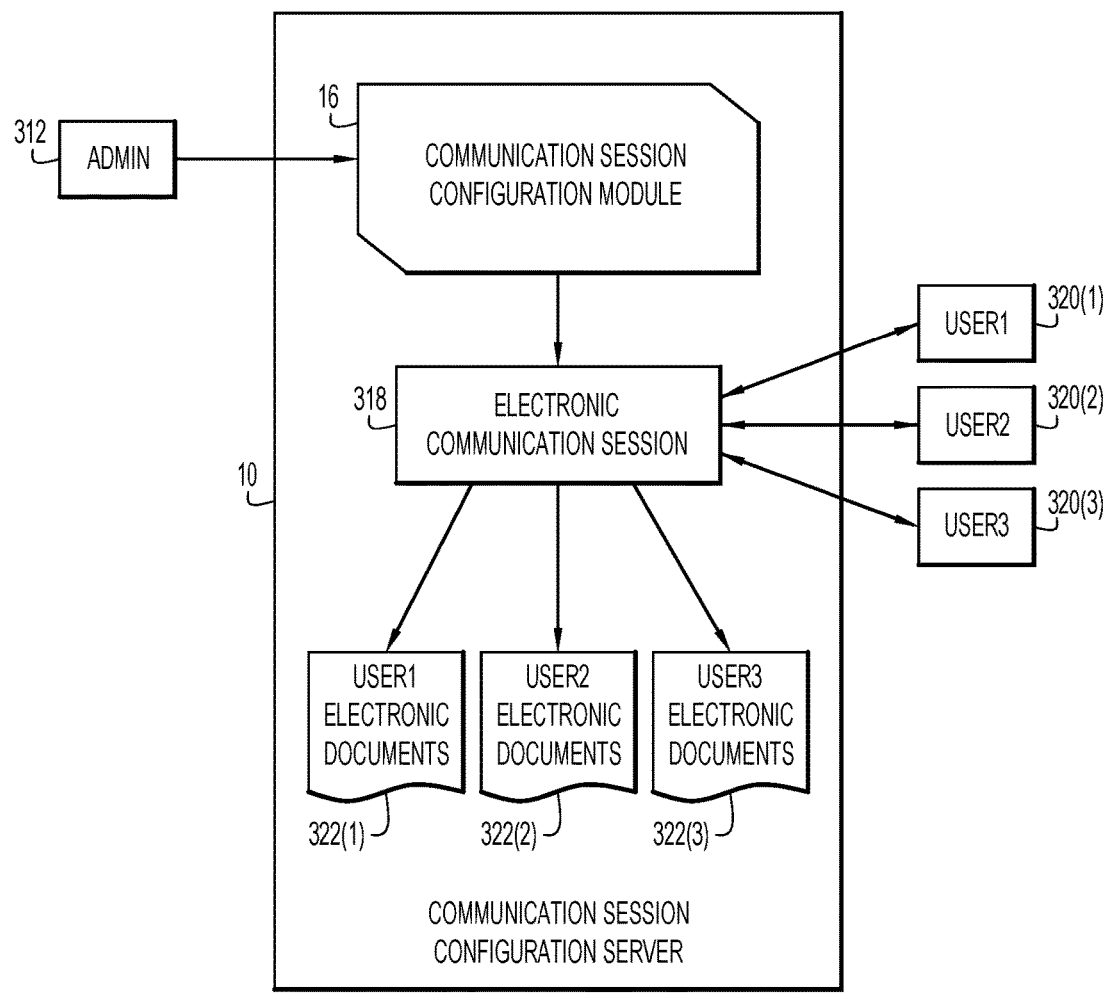
FIG. 3B is another diagrammatic illustration of the example communication session of FIG. 3A.

FIGS. 3A, 3B illustrate example functions of the communication session configuration module 16. As shown in FIG. 3A, three users 320(1)-(3) wish to participate in an electronic communication session 318 (e.g., generated by ICS software) via communication session configuration server 10. In this example, user 320(1) may be a doctor, user 320(2) may be a care coordinator, and user 320(3) may be a patient. A purpose of the electronic communication is to discuss a current patient prescription. However, the applicable healthcare policy requires that the users 320(1)-(3) sign an end user license agreement, a privacy agreement, and insurance forms.

An administrator 312 may configure communication session configuration module 16 with a rule set for the electronic communication session 318 to require the reception of an end user license agreement, a privacy agreement, and insurance forms for each user 320(1), 320(2), 320(3) before permitting inter-user communication in the electronic communication session 318. The electronic communication session 318 (e.g., via communication session configuration module 16) may prompt the users 320(1)-(3) to submit the required documents, and may further notify the users 320(1)-(3) that they will not be permitted to communicate over the electronic communication session 318 (e.g., by typing, speaking, etc.) until the required documents are received.

In an embodiment, every user 320(1)-(3) is notified as to the status of other user required documents. For example, after submitting each document required by user 320(1), the communication session configuration module 16 may notify user 320(1) that communication via the electronic communication session 318 is not yet enabled because users 320(2), 320(3) have not submitted their respective required documents.

Turning now to FIG. 3B, users 320(1)-(3) have submitted their respective required documents 322(1)-(3). In particular, electronic documents 322(1) include the end user license agreement, privacy agreement, and insurance forms for user 320(1); electronic documents 322(2) include the end user license agreement, privacy agreement, and insurance forms for user 320(2); and electronic documents 322(3) include the end user license agreement, privacy agreement, and insurance forms for user 320(3). After the required documents 322(1)-(3) have been authenticated/verified, the communication session configuration module 16 enables communication via the electronic communication session 318. Thus, users 320(1)-(3) discuss the current patient prescription in accordance with the applicable healthcare policy.

In an embodiment, every user 320(1)-(3) may view the documents 322(1)-(3) that have been submitted by every other user 320(1)-320(3). In an embodiment, the users 320(1)-(3) are notified only when communication has been enabled (i.e., the users 320(1)-(3) are not notified of the status of other user required documents). In an embodiment, the users who have submitted the required documents may communicate via the electronic communication session 318. For example, if user 320(1) and user 320(2) have both submitted all of their respective required documents, and user 320(3) has not, the communication session configuration module may enable user 320(1) and user 320(2), but not user 320(3), to communicate with each other via the electronic communication session 318.

Figure 4A:
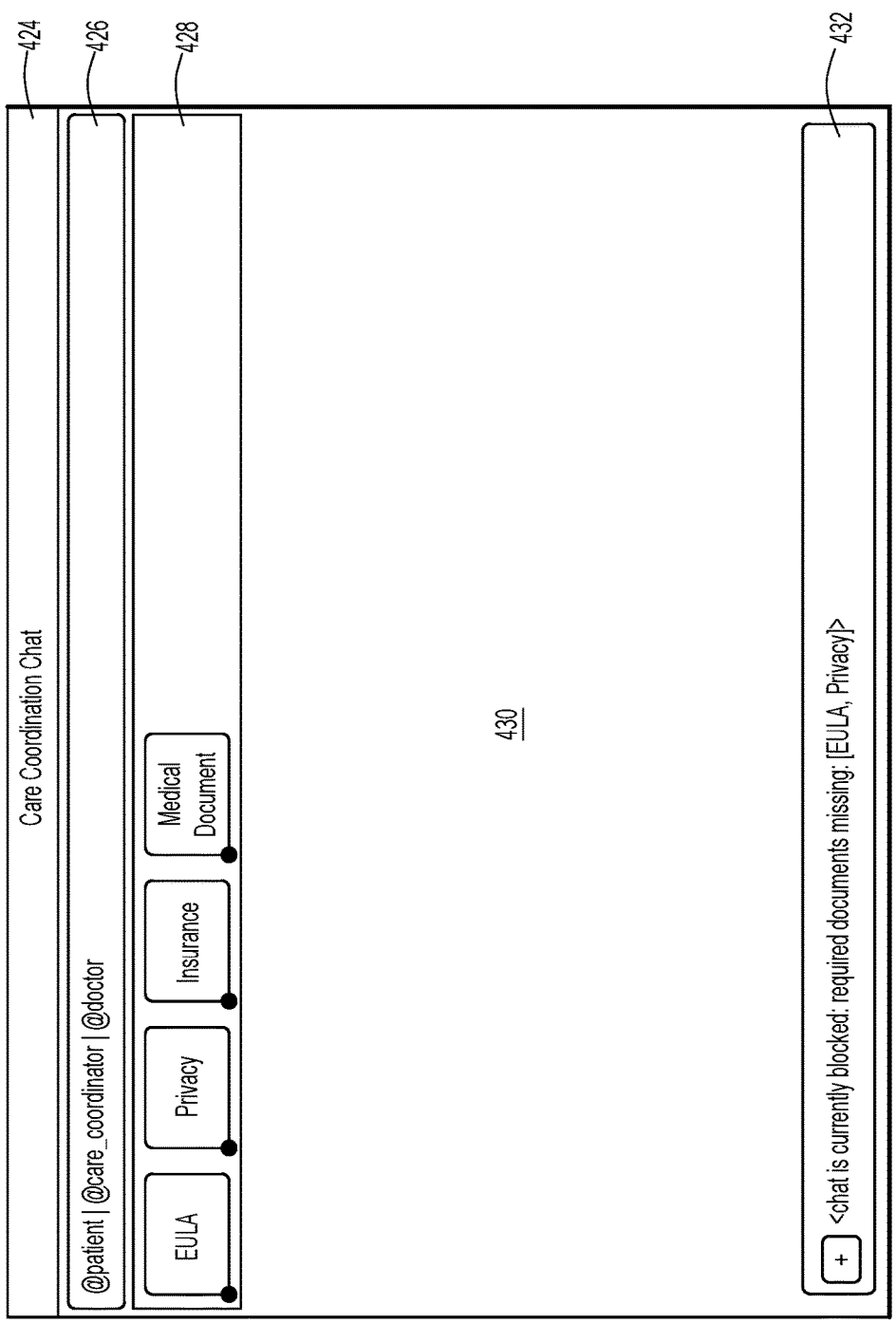
FIG. 4A is an illustration of an example graphical user interface in accordance with an embodiment of the present invention.
Figure 4B:
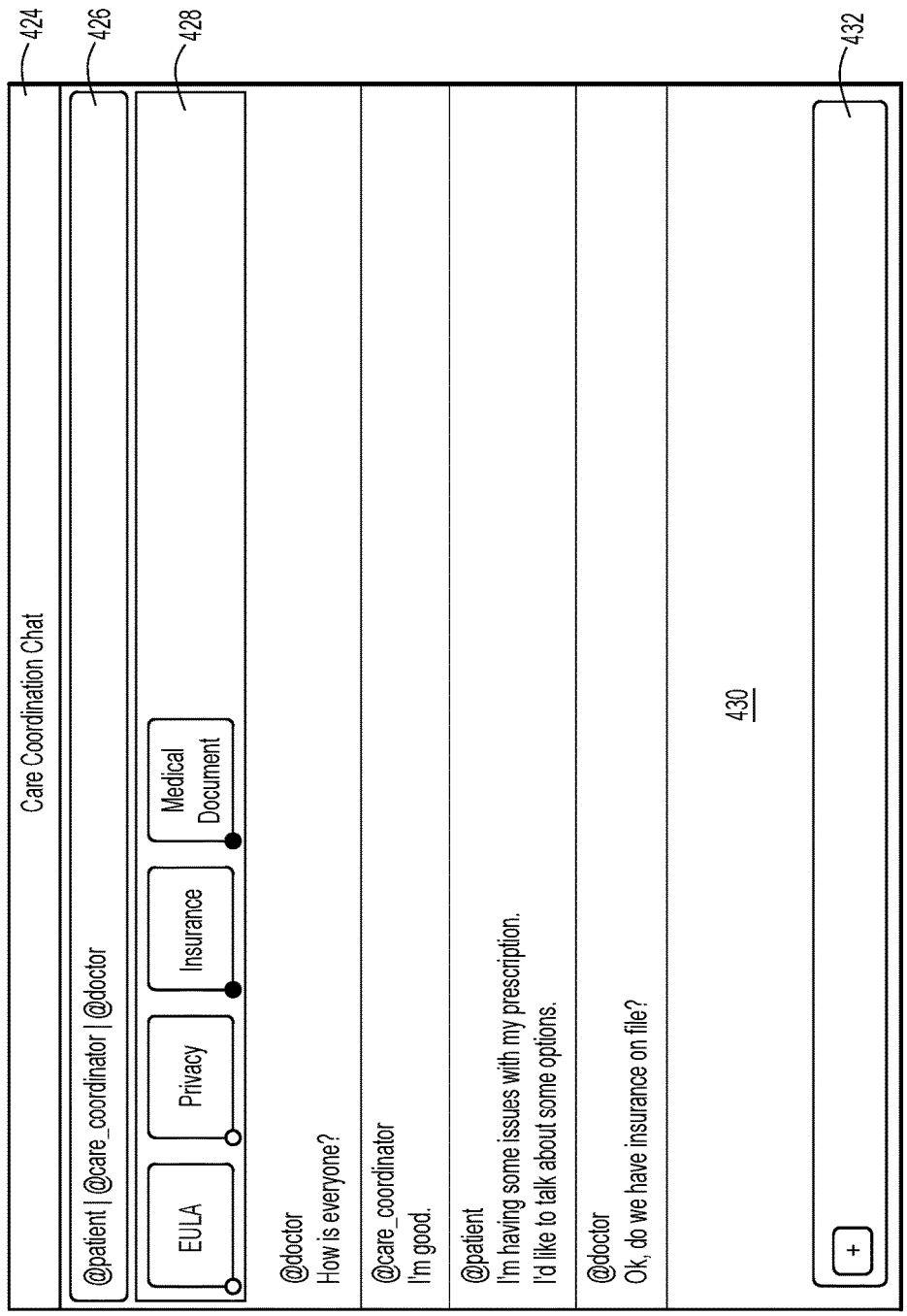
FIG. 4B is another illustration of the example graphical user interface of FIG. 4A.

FIGS. 4A, 4B illustrate an example GUI with which a specific participant (e.g., one or more of users 320(1)-(3)) may interact. As illustrated by header 424, an administrator (e.g., administrator 312) has created the electronic communication session (e.g., electronic communication session 318), titled "Care Coordination Chat." Under the header, handle display 426 shows a handle for each user 320(1)-(3): user 320(1) ("@doctor"), user 320(2) ("@care coordinator"), and user 320(3) ("@patient"). The handle display 426 enables the users 320(1)-(3) to identify the participants of the electronic communication session.

Document container display 428 is located beneath the handle display, and includes document containers. In this example, the document containers correspond to four types of documents: an end user license agreement ("EULA"), a privacy agreement ("Privacy"), a proof of insurance document ("Insurance"), and a medical document (e.g., patient prescription records) ("Medical Document"). In general, there may be any number of document containers corresponding to different documents/types of documents.

The administrator may set the rules for the electronic communication session 318. For instance, different rules may be associated with different document containers. By way of example, the rules (e.g., rules associated with the EULA and Privacy document containers) may stipulate that all users 320(1)-(3) must submit respective end user license agreements and privacy agreements before user messages are displayed in the text display 430. The rules (e.g., rules associated with the Insurance document container) may further stipulate that the care coordinator 320(2) must submit the proof of insurance document before the medical document.

In this example, the care coordinator 320(2) initiates the Care Coordination Chat and invites the doctor 320(1) and patient 320(3). Initially, the chat is disabled. A notification 432 is provided to the users 320(1)-(3) stating that the chat is currently blocked, and that the respective end user license agreements and privacy agreements are required.

After the users 320(1)-(3) submit their respective end user license agreements and privacy agreements, user messages are displayed in the text display 430, as illustrated in FIG. 4B. At some point in the conversation, users 320(1)-(3) may wish to view the medical document (e.g., to facilitate the conversation). Per the rules (e.g., rules associated with the Medical Document document container) set by the administrator, the care coordinator 320(2) must first submit the proof of insurance document, and may then submit the medical document.

It will be appreciated that the embodiments described above and illustrated in the drawings represent only a few of the many ways of implementing embodiments for messaging system communication sessions based on document containers.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, communication session configuration module 16, etc.). These systems may include any types of monitors and input devices (e.g., keyboard, mouse, voice recognition, etc.) to enter and/or view information.

It is to be understood that the software (e.g., communication session configuration module 16) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., communication session configuration module 16) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., documents). The database system may be implemented by any number of any conventional or other databases, data stores or storage structures (e.g., files, databases, data structures, data or other repositories, etc.) to store information (e.g., documents). The database system may be included within or coupled to the server and/or client systems. The database systems and/or storage structures may be remote from or local to the computer or other processing systems, and may store any desired data (e.g., documents).

The present invention embodiments may employ any number of any type of user interface (e.g., Graphical User Interface (GUI), command-line, prompt, etc.) for obtaining or providing information (e.g., documents), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any collaboration messaging system that uses pinned document holders.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of conducting an electronic messaging session comprising:
    requesting submission of a plurality of electronic documents into the electronic messaging session from one or more participants of the electronic messaging session in accordance with a series of rules, wherein the series of rules is associated with actions for the electronic messaging session and specify an order indicating a particular document of the plurality of documents to be submitted prior to submission of other documents of the plurality of documents;
    preventing transmission of electronic messages in the electronic messaging session by each of the one or more participants; and
    in response to receiving the requested plurality of electronic documents into the electronic messaging session from the one or more participants in the specified order, performing the associated actions of the series of rules for the electronic messaging session including enabling transmission of electronic messages in the electronic messaging session by the one or more participants submitting the requested plurality of electronic documents.

2. The method of claim 1, further comprising:
    configuring one or more document containers for the electronic messaging session, wherein each document container is associated with a type of document and a set of rules with corresponding actions for the electronic messaging session;
    receiving a requested electronic document into the electronic messaging session; and
    initiating the corresponding actions for the electronic messaging session in accordance with the set of rules of the document container associated with the type of the received electronic document.

3. The method of claim 2, wherein the set of rules provides a request for an electronic document for the electronic messaging session.

4. The method of claim 2, wherein the set of rules provides a request for an electronic document from each participant of the electronic messaging session.

5. The method of claim 2, wherein each set of rules provides a request for a prerequisite electronic document.

6. The method of claim 2, further comprising:
    identifying a document container corresponding to a received electronic document based on one or more selected from a group of: a document template, pattern recognition, a file extension, an embedded code, and an embedded tag.

7. The method of claim 1, wherein the associated actions for the electronic messaging session include controlling reception of electronic documents into the electronic messaging session.

8. A computer program product for conducting an electronic messaging session comprising:
    a computer readable storage medium having computer readable program code embodied therewith, the computer readable program code, when executed by a processor, causes the processor to:
        request submission of a plurality of electronic documents into the electronic messaging session from one or more participants of the electronic messaging session in accordance with a series of rules, wherein the series of rules is associated with actions for the electronic messaging session and specify an order indicating a particular document of the plurality of documents to be submitted prior to submission of other documents of the plurality of documents;
        prevent transmission of electronic messages in the electronic messaging session by each of the one or more participants; and
        in response to receiving the requested plurality of electronic documents into the electronic messaging session from the one or more participants in the specified order, perform the associated actions of the series of rules for the electronic messaging session including enabling transmission of electronic messages in the electronic messaging session by the one or more participants submitting the requested plurality of electronic documents.

9. The computer program product of claim 8, wherein the computer readable program code further causes the processor to:
    configure one or more document containers for the electronic messaging session, wherein each document container is associated with a type of document and a set of rules with corresponding actions for the electronic messaging session;
    receive a requested electronic document into the electronic messaging session; and
    initiate the corresponding actions for the electronic messaging session in accordance with the set of rules of the document container associated with the type of the received electronic document.

10. The computer program product of claim 9, wherein the set of rules provides a request for an electronic document for the electronic messaging session.

11. The computer program product of claim 9, wherein the set of rules provides a request for an electronic document from each participant of the electronic messaging session.

12. The computer program product of claim 9, wherein each set of rules provides a request for a prerequisite electronic document.

13. The computer program product of claim 9, wherein the computer readable program code further causes the processor to:

identify a document container corresponding to a received electronic document based on one or more selected from a group of: a document template, pattern recognition, a file extension, an embedded code, and an embedded tag.

14. The computer program product of claim 8, wherein the associated actions for the electronic messaging session include controlling reception of electronic documents into the electronic messaging session.

15. A system of conducting an electronic messaging session comprising:

a computer system including at least one processor configured to:

request submission of a plurality of electronic documents into the electronic messaging session from one or more participants of the electronic messaging session in accordance with a series of rules, wherein the series of rules is associated with actions for the electronic messaging session and specify an order indicating a particular document of the plurality of documents to be submitted prior to submission of other documents of the plurality of documents;

prevent transmission of electronic messages in the electronic messaging session by each of the one or more participants; and in response to receiving the requested plurality of electronic documents into the electronic messaging session from the one or more participants in the specified order, perform the associated actions of the series of rules for the electronic messaging session including enabling transmission of electronic messages in the electronic messaging session by the one or more participants submitting the requested plurality of electronic documents.

16. The system of claim 15, wherein the at least one processor is further configured to:

configure one or more document containers for the electronic messaging session, wherein each document container is associated with a type of document and a set of rules with corresponding actions for the electronic messaging session;

receive a requested electronic document into the electronic messaging session; and initiate the corresponding actions for the electronic messaging session in accordance with the set of rules of the document container associated with the type of the received electronic document.

17. The system of claim 16, wherein the set of rules provides a request for an electronic document for the electronic messaging session.

18. The system of claim 16, wherein each set of rules provides a request for a prerequisite electronic document.

* * * * *